US009475959B2

(12) United States Patent
Salviato et al.

(10) Patent No.: US 9,475,959 B2
(45) Date of Patent: *Oct. 25, 2016

(54) RADIATION CURABLE COMPOSITIONS

(75) Inventors: Jean-Yves Salviato, Les Bons Villers (BE); Jurgen Van Holen, Mariakerke (BE); Michel Tielemans, Wemmel (BE); Marc Decaux, Brussels (BE)

(73) Assignee: ALLNEX BELGIUM S.A., Brussels (BE)

( * ) Notice: Subject to any disclaimer, the term of this patent is extended or adjusted under 35 U.S.C. 154(b) by 116 days.

This patent is subject to a terminal disclaimer.

(21) Appl. No.: 13/991,268

(22) PCT Filed: Dec. 21, 2011

(86) PCT No.: PCT/EP2011/073524
§ 371 (c)(1),
(2), (4) Date: Jul. 15, 2013

(87) PCT Pub. No.: WO2012/089575
PCT Pub. Date: Jul. 5, 2012

(65) Prior Publication Data
US 2013/0310513 A1    Nov. 21, 2013

(30) Foreign Application Priority Data

Dec. 27, 2010 (EP) .................................. 10197040

(51) Int. Cl.
| C09D 175/16 | (2006.01) |
| C08F 283/00 | (2006.01) |
| C08G 18/08 | (2006.01) |
| C08G 18/34 | (2006.01) |
| C08G 18/42 | (2006.01) |
| C08G 18/66 | (2006.01) |
| C08G 18/67 | (2006.01) |
| C08G 18/76 | (2006.01) |
| C08L 33/00 | (2006.01) |

(52) U.S. Cl.
CPC ......... *C09D 175/16* (2013.01); *C08F 283/008* (2013.01); *C08G 18/0823* (2013.01); *C08G 18/348* (2013.01); *C08G 18/4238* (2013.01); *C08G 18/6659* (2013.01); *C08G 18/6705* (2013.01); *C08G 18/765* (2013.01); *C08L 33/00* (2013.01)

(58) Field of Classification Search
None
See application file for complete search history.

(56) References Cited

U.S. PATENT DOCUMENTS

| 5,556,912 A | 9/1996 | Brock et al. |
| 5,596,065 A | 1/1997 | Gerlitz et al. |
| 5,691,425 A | 11/1997 | Klein et al. |
| 5,990,192 A | 11/1999 | Gerlitz et al. |
| 6,538,046 B1 | 3/2003 | Paulus et al. |
| 2004/0242763 A1* | 12/2004 | Tielemans et al. ........... 524/589 |
| 2009/0270581 A1 | 10/2009 | Tielemans et al. |
| 2010/0210757 A1 | 8/2010 | Sommer et al. |
| 2011/0086180 A1 | 4/2011 | Tielemans |

FOREIGN PATENT DOCUMENTS

| CA | 2137621 | * 6/1995 |
| CN | 101805511 | 8/2010 |
| EP | 0 473 169 | 3/1992 |
| EP | 0 657 483 | 6/1995 |
| EP | 2 130 846 | 12/2009 |
| EP | 2 143 748 | 1/2010 |
| JP | 2009-533504 | 9/2009 |
| JP | 2011-140624 | 7/2011 |
| JP | 2011-523674 | 8/2011 |
| JP | 5194687 | 2/2013 |
| WO | 03/046095 | 6/2003 |
| WO | 2007/118781 | 10/2007 |
| WO | 2009/147092 | 12/2009 |

OTHER PUBLICATIONS

English Translation of Third Party Observations issued Apr. 27, 2015 in Japanese Application No. 2013-545225.
International Search Report issued Mar. 14, 2012 in International (PCT) Application No. PCT/EP2011/073087.
International Search Report issued Apr. 17, 2012 in International (PCT) Application No. PCT/EP2011/073524.

* cited by examiner

*Primary Examiner* — Jeffrey Washville
(74) *Attorney, Agent, or Firm* — Wenderoth, Lind & Ponack, L.L.P.

(57) ABSTRACT

The present invention relates to an ethylenically unsaturated hydroxyl-terminated polyurethane (I) obtained by reacting (i) at least one ethylenically unsaturated compound (A) containing at least two reactive groups capable of reacting with isocyanate groups and at least one ethylenically unsaturated group; with (ii) at least one saturated alcohol component (B) comprising: (iia) at least one saturated hydroxylated compound (B1) containing hydrophilic groups capable of rendering the polyurethane dispersible in aqueous medium either directly or after the reaction with a neutralizing agent to provide a salt, and, optionally, at least one compound (B2) that is selected from saturated polyester polyols (B21) and/or from saturated polycarbonate polyols (B22); and/or (iib) at least one compound (B3) that is selected from saturated polyester polyols (B31) containing compound (B1) moieties and/or from saturated polycarbonate polyols (B32) containing compound (B1) moieties; and, optionally, one or more of compounds (B1) and/or (B2); (iii) optionally, at least one ethylenically unsaturated compound (C) containing essentially one reactive group capable of reacting with isocyanate groups; with (iv) at least one polyisocyanate (D) selected from a tetramethylxylenediisocyanate. The present invention further relates to dispersions in water containing same, to their production and uses.

17 Claims, No Drawings

RADIATION CURABLE COMPOSITIONS

The present invention relates to ethylenically unsaturated hydroxyl-functional polyurethanes, to radiation curable compositions comprising same and to their preparation. The compositions of the invention in particular are suited to coat wood, plastic and concrete.

Radiation curable polyurethane dispersions are known since long to provide coatings for different substrates such as wood, plastics and metal, which show good mechanical and chemical resistance as well as flexibility. Ethylenically unsaturated polyurethanes have been made from the end capping of isocyanate-terminated polyurethane prepolymer with ethylenically unsaturated monomers or from the chain extension of isocyanate terminated ethylenically unsaturated polyurethane prepolymers with polyamine or with water.

Such prepolymers are diluted with organic solvents before dispersion in water, in order to reduce their viscosities. The need to remove these solvents from the water-based dispersion is one of the major disadvantages of these known compositions.

Solvent free processes of synthesizing radiation curable polyurethane dispersions have also been described. In U.S. Pat. No. 5,596,065 and EP2143748 e.g., last free isocyanate groups of low molecular weight ethylenically unsaturated isocyanate-terminated polyurethane are reacted to give allophanate groups. In WO03046095, an unsaturated polyurethane polymer is prepared from tetramethylxylene diisocyanate (TMXDI) as a major component of the NCO terminated prepolymer intermediate. Further, the unsaturated polyurethane polymer disclosed in WO03046095 does not disclose the use of any ethylenically unsaturated compound containing at least two reactive groups capable of reacting with isocyanate groups and at least one ethylenically unsaturated group for the preparation of the unsaturated polyurethane.

EP0657483 disclsoses a water-dilutable two-component system comprising an aqueous polyurethane dispersion. The intermediates disclosed in EP0657483 are not polyurethanes according to the present invention.

Starting from a low molecular weight hydroxyl-terminated unsaturated polyurethane prepolymer in place of starting from an isocyanate terminated polyurethane prepolymer is another way to obtain solvent free radiation curable polyurethanes, see e.g. U.S. Pat. No. 5,990,192.

The method described therein has the advantage that the prepolymer is less sensitive to humidity and has a better storage stability as it does not contain any free isocyanate groups.

Surprisingly however, radiation curable polyurethane dispersions comprising such hydroxyl-terminated polyurethane prepolymers prepared according to a solvent free process resulted in films with very poor water release properties.

Against this background we now provide an ethylenically unsaturated hydroxyl-terminated polyurethane (I) obtained by reacting (i) at least one ethylenically unsaturated compound (A) containing at least two reactive groups capable of reacting with isocyanate groups and at least one ethylenically unsaturated group; with (ii) at least one saturated alcohol component (B) comprising, more in particular consisting of : (iia) at least one saturated hydroxylated compound (B1) containing hydrophilic groups capable of rendering the polyurethane dispersible in aqueous medium either directly or after the reaction with a neutralizing agent to provide a salt, and, optionally, at least one compound (B2) that is selected from saturated polyester polyols (B21) and/or from saturated polycarbonate polyols (B22); and/or (iib) at least one compound (B3) that is selected from saturated polyester polyols (B31) containing compound (B1) moieties and/or from saturated polycarbonate polyols (B32) containing compound (B1) moieties; and, optionally, one or more of compounds (B1) and/or (B2); (iii) optionally, at least one ethylenically unsaturated compound (C) containing essentially one (or one) reactive group capable of reacting with isocyanate groups; (iv) at least one polyisocyanate (D) selected from a tetramethylxylenediisocyanate. Preferably the reactive groups capable of reacting with isocyanate groups are hydroxyl groups. The polyurethane (I) of the invention, optionally, can further be prepared from (v) at least one further polyisocyanate different from said tetramethylxylenediisocyanate, if component (B) comprises one or more of said compounds (B2) and/or (B3).

By "obtained by" is meant to designate in particular that the polyurethanes (I) of the invention are obtained by a process consisting essentially of reacting compounds (A), (B), (D), the optional compound (C) and the optional further isocyanate (v) different from tetramethylxylenediisocyanate. In other words, advantageously the amounts (typically expressed in weight %) of compounds (A), (B), (D), optional compound (C) and optional further isocyanate (v) that are used to prepare the polyurethane (I) according to the invention sum up to 100%.

By "polyurethane" is meant a urethane having at least two carbamate groups.

By "hydroxyl-terminated" is meant to designate that the polyurethane (I) of the invention has free hydroxyl groups and that the number of these free hydroxyl groups is higher than the number of free isocyanate groups.

By "ethylenically unsaturated groups" is meant to designate in the present invention groups with one or more carbon-carbon double bonds which under the influence of irradiation and/or a (photo)initiator can undergo radical polymerization. The polymerizable ethylenically unsaturated groups are generally chosen from (meth)acrylic groups. In the present invention, the term "(meth)acryl' is to be understood as to encompass both acryl and methacryl compounds or derivatives as well as mixtures thereof. Acrylic groups are generally preferred.

By "polyol" is meant in the present invention a compound containing on average more than 1 hydroxyl group per molecule. Typically a polyol as used in the invention contains on average at least 1.5 hydroxyl groups, preferably at least 1.8 hydroxyl groups. Generally the polyol contains at least 2 hydroxyl groups.

In compound A, the at least two reactive groups capable of reacting with an isocyanate preferably are hydroxyl groups. Compounds A typically are selected from the group consisting of polyester (meth)acrylates comprising hydroxyl groups, polyepoxy (meth)acrylates comprising hydroxyl groups, and mixtures thereof. Suitable compounds (A) are e.g. those obtained from the reaction of diglycidyl compounds with (meth)acrylic acid. Examples thereof include the aliphatic diglycidyl compounds derived from alpha, omega diols having 4 to 12 carbon atoms or derived from polyoxyalkylenediols, especially polyethylene glycol, polypropylene glycol or mixtures thereof that contain oxyalkylene groups. Preference is given, for example, to 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, bisphenol A diglycidyl ether, bisphenol F diglycidyl ether, hydrogenated bisphenol A diglycidyl ether, hydrogenated bisphenol F diglycidyl ether, and their ethoxylated and/or propoxylated equivalents. It is also possible to use diglycidyl esters, such as diglycidyl hexahydrophthalate. Also diglycidyl esters, such as diglycidyl phthalate, N,N-diglycidyl aniline, N,N-diglycidyl-4-glycidyloxyaniline can be used. Preferred are bisphenol A diglycidyl ether, bisphenol F diglycidyl ether, and their ethoxylated and/or propoxylated equivalents. They correspond to polyepoxy(meth)acrylates comprising hydroxyl groups. Compounds obtained from partial esterification of aliphatic and/or aromatic polyhydric polyols with (meth)acrylic acid and having a residual average hydroxyl functionality of at least 2.0 in the molecule, can also be used.

They correspond to polyester(meth)acrylates comprising hydroxyl groups. In this context, it is also possible to use as polyhydric polyols the reaction products of such polyols with ethylene oxide and/or propylene oxide or mixtures thereof, or reaction products of such polyols with lactones, which add to these polyols in a ring-opening reaction. Examples of suitable lactones are butyrolactone and, in particular $\epsilon$-caprolactone. Preferred are those alkoxylated polyols having not more than two alkoxy groups per hydroxyl functionality and $\epsilon$-caprolactone-modified polyols. It is known to those skilled in the art that the (meth)acrylation of polyols such as glycerol, trimethylolpropane, pentaerythritol, di-trimethylolpropane or di-pentaerythritol proceeds to a mixture of mono-, di-, tri-acrylate and up to tetra-, penta- and hexa-acrylate for the highest functionalized polyols, and that a possible way to characterize the mixture is by measuring its hydroxyl value. Examples are glycerol monoacrylate, trimethylolpropane mono-acrylate, pentaerythritol di-acrylate, di-trimethylolpropane di-acrylate, di-pentaerythritol tetra-acrylate and their polyethoxylated and/or polypropoxylated equivalents.

Compound (B1) in the present invention is a saturated hydroxylated compound containing hydrophilic groups capable of rendering the polyurethane dispersible in aqueous medium either directly or after the reaction with a neutralizing agent to provide a salt. Typically compound (B1) contains at least one hydroxyl group and preferably at least two hydroxyl groups. In compound (B1) the hydrophilic groups capable of rendering the polyurethane dispersible in aqueous medium can be of ionic and/or of non-ionic nature. Preferably they are of ionic nature, more preferably they are anionic groups, and most preferably they are acidic groups or the salts thereof. Examples of suitable acidic groups include carboxylic acid, sulfonic acid, and/or phoshonic acid groups. Suitable salts are carboxylates, sulfonates and/or phosphonates. Examples of suitable counterions are ammonium, trimethylammonium, triethylammonium, sodium, potassium, lithium and the like. Non-ionic stabilization is often provided by hydrophilic moieties including polyethyleneoxide, polypropyleneoxide, or block copolymers made therefrom. Preferred hydrophilic groups are carboxylic acid groups and the salts thereof. Compounds (B1) are therefore typically hydrophilic compounds.

Typically compounds (B1) are saturated hydroxycarboxylic acids containing at least one hydroxyl group and at least one carboxylic acid group. In general the number of hydroxyl groups in said compound is at least two and preferably at most three. In general the number of carboxylic acid groups in said compound is at most three. Preferably the hydroxycarboxylic acid in question is a saturated aliphatic hydroxycarboxylic acid having at least one hydroxyl group. Particularly preferred are aliphatic saturated mono-, di- and/or or tri carboxylic acids having at least one hydroxyl group per molecule. Most preferred are the aliphatic saturated mono-carboxylic acids containing at least one, often at least two hydroxyl groups.

Suitable saturated aliphatic hydroxycarboxylic acids (B1) are e.g. represented by the general formula $(HO)_xR(COOH)_y$, wherein R represents a straight or branched hydrocarbon residue having from 1 to 12 carbon atoms, wherein x is an integer from 1 to 3 and y is an integer from 1 to 3. Typically the sum of x+y is at most 5. Examples of these hydroxycarboxylic acids include citric acid, maleic acid, lactic acid and tartaric acid. Preferred are those hydroxycarboxylic acids wherein y=1 in the above general formula. The most preferred are the a,a-dimethylolalkanoic acids, wherein x=2 and y=1 in the above general formula, such as for example, 2,2-dimethylolpropionic acid and/or 2,2-dimethylolbutanoic acid.

Compounds (B2) in the invention can be selected from saturated polyester polyols (B21) and/or from saturated polycarbonate polyols (B22).

Suitable saturated polyester polyols (B21) are the hydroxyl terminated reaction products of polyhydric alcohols, preferably dihydric alcohols, with polycarboxylic acids, preferably dicarboxylic acids, their corresponding anhydrides, or esters thereof, as well as those obtained from the ring opening polymerization of lactones. The polycarboxylic acids which may be used for the formation of these polyester polyols (B21) may be aliphatic, cycloaliphatic and/or heterocyclic and they may, optionally, be substituted. Also optionally substituted aromatic polycarboxylic acids can be used, as it is generally known that carbon carbon double bonds contained in aromatic rings are inert during radiation curing. Examples of dicarboxylic acids that may be used are succinic acid, glutaric acid, adipic acid, suberic acid, azelaic acid, sebacic acid, dodecanedicarboxylic acid, hexahydrophthalic acid, isophthalic acid, terephthalic acid, ortho-phthalic acid, tetrachlorophthalic acid, 1,5-naphthalenedicarboxylic acid, tetrahydrophthalic acid, trimellitic acid, trimesic acid and pyromellitic acid, saturated fatty acid dimers, or mixtures thereof (of any of these). The polyhydric alcohols which are preferably used for the preparation of the polyester polyols (B21) include ethylene glycol, propylene glycol, 1,3-propanediol, 1,3-butanediol, 1,4-butanediol, 1,5-pentanediol,1,6-hexanediol, neopentyl glycol, diethylene glycol, dipropylene glycol, triethylene glycol, tetraethylene glycol, dibutylene glycol, 2-methyl-1,3-pentanediol, 2,2,4-trimethyl-1,3-pentanediol, 1,4-cyclohexanedimethanol, ethylene oxide adducts or propylene oxide adducts of bisphenol A or hydrogenated bisphenol A, and mixtures thereof (of any of these). Triols or tetraols such as glycerin, trimethylolethane, trimethylolpropane, di-trimethylolethane, di-trimethylolpropane and pentaerythritol may also be used. Particularly preferred are polyester polyols (B21) made from the polycondensation of neopentylglycol and adipic acid.

Typically the saturated polyester polyols (B21) used in the present invention have a weight average molecular weight (Mw) of between 500 and 5000 daltons. Generally the Mw of these compounds is at least 700 daltons. Generally the Mw of these compounds is at most 4000, more preferably at most 3000 daltons. The Mw is herein typically calculated according to the following formula: Mw=56*functionality*1000/measured IOH, wherein "IOH" stands for the hydroxyl value and "functionality" stands for the number of OH groups per molecule.

Suitable saturated polycarbonate polyols (B22) include the reaction products of diols such as ethylene glycol, 1,3-propanediol, 1,3-butanediol, 1,4-butanediol, 1,5-pentanediol, 1,6-hexanediol, diethylene glycol, triethylene glycol, dipropylene glycol, tripropylene glycol or tetraethylene glycol with phosgene, or with one or more of the following: dialkylcarbonates (such as dimethycarbonate), diarylcarbonates (such as diphenylcarbonate), or cyclic carbonates (such as ethylene and/or propylene carbonate).

Typically the saturated polycarbonate polyols (B22) used in the present invention have a weight average molecular weight (Mw) of between 500 and 5000 daltons. Generally the Mw of these compounds is at least 700 daltons. Generally the Mw of these compounds is at most 4000, more preferably at most 3000 daltons. The Mw is herein calculated as described above.

Compounds (B3) in the invention can be selected from saturated polyester polyols (B31) containing compound (B1) moieties and/or from saturated polycarbonate polyols (B32) containing compound (B1) moieties, optionally used in combination with one or more of compounds (B1) and/or compounds (B2). By "moieties" is meant in particular monomer units. Preferably compound (B3) is selected from (or consists of) one more compounds (B31), used alone or in combination with one or more of compounds (B1) and/or (B2). Compounds (B31) may be prepared from the same polyhydric polyols and polycarboxylic acids as described above for compounds (B21). A typical example of a compound (B31) is the polycondensation product of adipic acid, of 2,2-dimethylolpropionic acid and of neopentylglycol, typically with a hydroxyl value of about 168 and an acid value of about 56.

In the above, polyester polyols (B31) advantageously are different from polyester polyols (B21) and polycarbonate polyols (B32) advantageously are different from polycarbonate polyols (B22).

In a first variant of the invention, the saturated alcohol component (B) used in the preparation of the polyurethane (I) comprises, more in particular consists of, at least one saturated hydroxylated compound (B1) containing hydrophilic groups capable of rendering the polyurethane dispersible in aqueous medium either directly or after the reaction with a neutralizing agent to provide a salt and, optionally, one or more compounds (B2) selected from saturated polyester polyols (B21) and/or from saturated polycarbonate polyols (B22). In this first variant the compounds (B1) and where present (B2) can be added separately, but generally if both are present they are added under the form of a mixture or in the form of a slurry.

In a second variant of the invention, the saturated alcohol component (B) used in the preparation of the polyurethane (I) comprises, more in particular consists of, at least one compound (B3) that is selected from saturated polyester polyols (B31) containing compound (B1) moieties and/or from saturated polycarbonate polyols (B32) containing compound (B1) moieties; and, optionally, one or more of compounds (B1) and/or (B2).

In a third variant of the invention, the saturated alcohol component (B) comprises, more in particular consists of, at least one alcohol component according to the first variant and at least one alcohol component according to the second variant.

In a fourth and particular variant of the invention, the saturated alcohol component (B) comprises, more in particular consists of, at least one compound (B1), and, optionally, one or more of compounds (B2) and/or (B3).

Provided as such is an ethylenically unsaturated hydroxyl-terminated polyurethane (I) obtained by reacting (i') at least one ethylenically unsaturated compound (A) containing at least two reactive groups capable of reacting with isocyanate groups and at least one ethylenically unsaturated group; with (ii') at least one saturated hydroxylated compound (B1) containing hydrophilic groups capable of rendering the polyurethane dispersible in aqueous medium either directly or after the reaction with a neutralizing agent to provide a salt; (iii') optionally, at least one polyester polyol (B21) and/or at least one saturated polycarbonate polyol (B22); (iv') optionally, at least one saturated polyester polyol (B31) containing compound (B1) moieties and/or at least one saturated polycarbonate polyol (B32) containing compound (B1) moieties; (v') optionally, at least one ethylenically unsaturated compound (C) containing essentially one (or one) reactive group capable of reacting with isocyanate groups; and (vi') at least one polyisocyanate (D). Preferably the reactive groups capable of reacting with isocyanate groups are hydroxyl groups. Preferably TMXDI is the only polyisocyanate used, more preferably p-tetramethylxylenediisocyanate (p-TMXDI).

For each and every of these variants, preferred compounds (B1), (B21), (B22), (B31) and (B32) have been given above.

By an ethylenically unsaturated compound (C) containing essentially one functional group capable of reacting with an isocyanate is meant to designate in the present invention compounds containing one nucleophilic functional group capable of reacting with an isocyanate and at least one ethylenically unsaturated function such as (meth)acrylic and/or allylic groups. The unsaturated groups preferably are (meth)acrylic groups. Acrylic groups are particularly preferred. In general, the functional groups capable of reacting with an isocyanate are hydroxyl groups.

Preferred compounds (C) are (meth)acryloyl monohydroxy compounds, more particularly poly(meth)acryloyl monohydroxy compounds. By "poly" is meant that the compound has at least two (meth)acryloyl functions. By (meth)acryloyl is meant acryloyl, (meth)acrcyloyl and mixtures thereof. Acryloyl groups again are preferred. Useful compounds include the esterification products of aliphatic and/or aromatic polyols with (meth)acrylic acid having a residual average hydroxyl functionality of about 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are butyrolactone and, in particular ε-caprolactone. These modified or unmodified polyols are partly esterified with acrylic acid, methacrylic acid or mixtures thereof until the desired residual hydroxyl functionality is reached. Suitable compounds are the (meth)acrylic esters with linear and branched polyols in which at least one hydroxyl functionality remains free, like hydroxyalkyl(meth)acrylates having 1 to 20 carbon atoms in the alkyl group. Preferred molecules in this category are hydroxyethyl(meth)acrylate, hydroxypropyl (meth)acrylate, hydroxybutyl(meth)acrylate. Particularly preferred are compounds comprising at least two (meth) acryl functions such as glycerol diacrylate, trimethylolpropane diacrylate, pentaerythritol triacrylate, ditrimethylolpropane triacrylate, dipentaerythritol pentaacrylate and their (poly)ethoxylated and/or (poly)propoxylated equivalents. Most preferred are glycerol diacrylate, trimethylolpropane diacrylate, and mixtures thereof as well as their (poly) ethoxylated and/or (poly)propoxylated equivalents. Particularly preferred is the propoxylated glycerol diacrylate (with for instance IOH~179).

The tetramethylxylenediisocyanate (TMXDI) used to prepare the polyurethane (I) may be m-tetramethylxylenediisocyanate, p-tetramethylxylenediisocyanate, mixtures thereof, or derivatives thereof. By "tetramethylxylenediisocyanate"

is also meant tetramethylxylylenediisocyanate. Examples of derivatives are the adducts or prepolymers prepared from TMXDI and polyols such as the trimethylol propane—TMXDI adduct (known commercially under the name Cythane 3174). Preferred is p-TMXDI.

Provided that component (B) contains one or more of compounds (B2) and/or (B3), then optionally at least one further polyisocyanate can be used in combination with TMXDI, in casu p-TMXDI. Yet, typically also then TMXDI is the only polyisocyanate used.

By "further" is meant in particular a polyisocyanate different from TMXDI, in casu p-TMXDI. Suitable examples of such "further" polyisocyanates are given below.

By a "polyisocyanate" is meant to designate organic compounds comprising at least two isocyanate groups. The polyisocyanate compound usually comprises not more than three isocyanate groups. The polyisocyanate can be an aromatic polyisocyanate and/or a (cyclo)aliphatic polyisocyanate. By (cyclo)aliphatic is meant aliphatic, cycloaliphatic, or mixtures thereof. Most preferred are aliphatic isocyanates.

Non-exhaustive examples of suitable aliphatic and cycloaliphatic polyisocyanates are 1,6-diisocyanatohexane (HDI), 1,1'-methylene bis [4-isocyanatocyclohexane] (H12MDI), 5-isocyanato-1-isocyanatomethyl-1,3,3-trimethylcyclohexane (isophorone diisocyanate, (IPDI)). Aliphatic polyisocyanates containing more than two isocyanate groups are for example the derivatives of above mentioned diisocyanates like 1,6-diisocyanatohexane biuret and trimer. The polyisocyanate compound is preferably a diisocyanate and most preferably is 1,6-diisocyanatohexane. Generally, compound (A) is used in an amount of from 25 to 65% by weight, relative to the total weight of the polyurethane (I). Preferably this amount is at least 40% by weight, more preferably at least 50% by weight. Preferably this amount is at most 60% by weight.

Generally, component (B) is used in an amount of from 5 to 40% by weight, relative to the total weight of the polyurethane (I). Typically, this amount is at most 35% by weight. In case that TMXDI is used in combination with one or more "further" polyisocyanates as specified above, then the total amount of compounds (B2) and (B3) used preferably is at least 5%, more preferably at least 10%, most preferably at least 15% by weight, relative to the total weight of the polyurethane (I).

Generally, the optional compound (C) is used in an amount of from 0 to 20% by weight, relative to the total weight of the polyurethane (I). Where present, this amount typically is at least 0.01% by weight, often at least 0.1% by weight.

Generally the total amount of polyisocyanates (D) used to prepare the polyurethane (I) is from 20 to 50% by weight, relative to the total weight of the polyurethane (I). Often, this amount is at least 25% by weight.

Generally TMXDI is the sole isocyanate used in the preparation of the polyurethane (I) of the invention.

Advantageously the amounts of compounds (A), (B), (D) and of the optional compounds (C) that are used to prepare the polyurethane (I) according to the invention sum up to 100% and typically compounds (A), (B) and the optional compounds (C) are used in stoechiometric excess with respect to compounds (D) to prepare an OH-terminated polyurethane (I).

Generally compounds (A), (B), (D) and the optional compounds (C) are used in such amounts that the ratio between the NCO (isocyanate) groups and between the reactive groups capable of reacting with said NCO groups (such as hydroxyl groups) is below 1. Preferably the ratio between both types of groups is between 0.5 and 0.95, more preferably between 0.6 and 0.9 even more preferably this ratio is between 0.7 and 0.8.

The polyurethane (I) according to the invention typically has a hydroxyl value of between 5 and 60 mg KOH/g, preferably between 10 and 40 mg KOH/g. Typically the hydroxyl value is at most 60 mg KOH/g, more typically at most 45 mg KOH/g. Typically the hydroxyl value is at least 10 mg KOH/g. The hydroxyl value of the polyurethane (I) is typically theoretically calculated on the basis of the amounts of compounds (A), (B), (D) and the optional compound (C) used to perform the synthesis.

The polyurethane (I) according to the invention typically has a weight average molecular weight (Mw) of between 3000 and 30.000 daltons. Generally the Mw of this compound is at least 5000 daltons. Generally the Mw of this compound is at most 25.000 daltons.

The polyurethane (I) according to the invention typically has a number average molecular weight (Mn) of between 1500 and 15.000 daltons. Generally the Mn of this compound is at least 2500 daltons. Generally the Mn of this compound is at most 13.000 daltons.

Molecular weights of the polyurethane (I) typically are measured by gel permeation chromatography (GPC) using polystyrene standards for calibration. Samples are then typically dissolved in tetrahydrofuran (THF), and injected at 40° C. on a 3×PLgel 5 μm Mixed-D LS 300×7.5 mm column with a Mw range from 162 to 377.400 daltons that is calibrated with polystyrene standards with a Mw range from 200 to 400.000 daltons. THF is herein used as solvent and the Refractive Index as detector.

Typically the polyurethane (I) of the invention is a water-dispersible polyurethane. By water-dispersible is meant herein a polyurethane that, when mixed with water or an aqueous medium, is able to form a two-phase system of particles in water. The two-phase system is typically a stable homogeneous dispersion of particles in water.

The present invention also relates to radiation curable composition comprising at least one ethylenically unsaturated hydroxyl-terminated polyurethane (I) of the invention. Typically the radiation curable composition is a radiation curable aqueous composition, more in particular a radiation curable polyurethane dispersion.

Compositions according to the invention preferably are obtained by a process comprising
  a first step comprising the reaction of compounds (A) through (D) as described above in order to form an ethylenically unsaturated hydroxyl-terminated polyurethane prepolymer (I),
  an optional second step comprising the reaction with a neutralizing agent in order to convert the hydrophilic groups provided by compound (B1) into anionic salts, and
  a step comprising the dispersion in an aqueous medium (typically water) of the polyurethane prepolymer obtained after the first or second step.

This process can be carried out by reacting a stoechiometric excess of compounds (A) through (C) with compounds (D), preferably under substantially anhydrous conditions and at a temperature between 30° C. and 130° C., more preferably between 50° C. and 100° C., until the reaction between the isocyanate groups and the isocyanate-reactive groups is substantially complete. The isocyanate content can be followed by titration with an amine. The titration is made according to ASTM D 2572-87. Preferably the level of free polyisocyanate molecules, especially free isocyanate groups that remain after reaction is as low as possible. Preferably this amount is between 0 and 0.1% based on the weight of the polyurethane (I), preferably between 0 and 0.05%. By percent is meant here grams of NCO groups per 100 grams of the polyurethane (I).

At the end of the first step an ethylenically unsaturated hydroxyl-terminated polyurethane prepolymer (I) is obtained. Such hydroxyl-terminated polyurethane prepolymer typically is obtained by using the compounds (A) through (D) in such amounts that the ratio between NCO (isocyanate) groups and the groups reacting with said NCO groups (such as hydroxyl groups) is below 1. Preferably the ratio between both types of groups is between 0.5 and 0.95, more preferably between 0.6 and 0.9, even more preferably this ratio is between 0.7 and 0.8.

The reaction may be facilitated by the addition of 5 to 50%, preferably 15 to 30%, by weight of a solvent in order to reduce the viscosity of the prepolymer. The solvent is preferably acetone or methylethylketone. During this process, it is common to use catalysts to accelerate the reaction of the isocyanates towards groups reactive with isocyanates (such as hydroxyl groups) and to use inhibitors in order to prevent the radical reaction of the reactive unsaturations.

The reaction can be carried out using a one shot process (wherein all the reagents are mixed together). It is also possible in the frame of this invention to use a sequential process during which compounds (A) through (D) are added incrementally in two or several portions or with a continuous feed. The reason for this is a better control on the exothermicity of the reaction, especially when no solvent is present.

In a preferred embodiment of the invention no solvent is used at all. An advantage of the present invention is that the polyurethanes (I) and compositions containing such polyurethanes (I) can be prepared according to a process that is completely solvent free.

In general, the prepolymer obtained after the reaction of compounds (A) through (D) and is dispersed in an aqueous medium by adding the prepolymer slowly into water or reversely by adding water to the prepolymer. Usually this dispersion proceeds under high shear mixing. Usually the dispersion requires the (preliminary) neutralization of the hydrophilic groups provided by compound (B1), such as the carboxylic acid groups provided by a saturated aliphatic hydroxycarboxylic acid, into salts. This is generally done by adding an organic or inorganic neutralizing agent, or mixtures thereof, to the prepolymer or to the water. Suitable neutralizing agents include volatile organic tertiary amines, such as trimethylamine, triethylamine, triisopropylamine, N,N-dimethylcyclohexylamine, N-methylmorpholine, N-ethylmorpholine, N-Methylpyrrolidine and N-methylpiperidine; hydroxyl containing tertiary amines, such as triethanolamine, N-Methyl diethanolamine, 2-Dimethylamino-2-Methyl-1-Propanol (DMAMP 80 from Angus); and non-volatile inorganic bases comprising monovalent metal cations, preferably alkali metals such as lithium, sodium and potassium, and anions such as hydroxides, hydrides, carbonates and bicarbonates that do not remain in the dispersion as such. The total amount of these neutralizing agents can be calculated according to the total amount of acid groups to be neutralized.

In general from 50% to 100% of the hydrophilic groups provided by compound (B1), which typically are carboxylic acid groups, are converted into ionic salt groups in said optional second step. Preferably this amount is at least 70%, most preferably at least 80%.

When preceded by a neutralization step, dispersion in water immediately follows neutralization. The dispersion step may be followed by a stripping step to remove volatile solvents if present at all. In general, after the formation of the dispersion of the polyurethane and when it contains a volatile solvent with a boiling point of below 100° C., the polymer dispersion is stripped. This is usually done under reduced pressure and at a temperature between 20 and 90° C., preferably 40 to 60° C. Stripping in general is performed until the residual solvent falls below 0.5% by weight of the water dispersion, preferably below 0.15% by weight of the water dispersion. In a preferred embodiment of the invention, however, no solvent is used, eliminating the need for such stripping step.

Compositions of the invention, in particular the radiation curable polyurethane dispersions of the invention, typically comprise at least 20% by weight, more preferably at least 25% by weight, most preferably at least 30% by weight, relative to the total weight of the composition, of at least one polyurethane (I) of the invention.

Compositions of the invention optionally can further comprise at least one polymerizable ethylenically unsaturated compound (E) that preferably contains substantially no reactive groups that can react with isocyanate groups such as hydroxyl groups. Though compound (E) can contain some residual hydroxyl groups, but the amount of these groups is sufficiently low so that it will not influence the properties of the polyurethane (I). Typically compounds (E), which in general are (met)acryloyl compounds, have a hydroxyl value of less than 25, more typically less than 15. Such compounds are hereafter further referred to as "non-hydroxyl" containing compounds. Typically compounds (E) have a water content of below 0.2%, more typically of below 0.1% by weight as measured via a Karl Fisher titration method.

Typically this optional compound (E) is a "non-hydroxyl" containing (meth)acryloyl-compound that preferably is selected from (meth)acrylated compounds comprising one or more (meth)acryl groups, more in particular one more acryl groups. Examples of such compounds (E) include urethane(meth)acrylates, polyester(meth)acrylates, (meth)acrylic(meth)acrylates and lower molecular weight (meth)acrylates, as well as mixtures thereof. By lower molecular weight (meth)acrylates in understood (meth)acrylates having a molecular weight of at most 1000, preferably at most 500. Molecular weights of such lower molecular weight compounds are typically calculated, but could also be measured via gel permeation chromatography (GPC) as described above.

In a first variant of the invention, the optional compound (E) is selected from (meth)acrylated compounds comprising at least two (meth)acryl groups and at most one other functional group. By other is meant herein different from (meth)acryl and different from hydroxyl. Particularly preferred are the esterification products of (meth)acrylic acid with polyols comprising at least 2 hydroxyl groups, said esterification products having an average residual hydroxyl functionality of at most 0.2, preferably less than 0.1. Particularly preferred are non-alkoxylated compounds. Compound (E) is then preferably selected from hexanediol di(meth)acrylate, trimethylolpropane tri(meth)acrylate, glycerol tri(meth)acrylate, pentaerythritol tetra(meth)acrylate, di-trimethylolpropane tetra(meth)acrylate, di-pentaerythritol hexa(meth)acrylate and mixtures thereof. Particularly preferred are trimethylolpropane tri(meth)acrylate and pentaerythritol tetra(meth)acrylate.

In a second variant of the invention, compound (E) is selected from alkoxylated(meth)acrylated compounds. Preferred compounds are ethoxylated and/or propoxylated compounds. More preferred are compounds having a degree of alkoxylation of 0.3 to 3 per hydroxyl group. Particularly preferred are (meth)acrylated compounds comprising at least two (meth)acryl groups, especially the esterification products of (meth)acrylic acid with alkoxylated polyols comprising at least 2 hydroxyl groups and from 0.3 to 3 alkoxy groups per hydroxyl group. Compound (E) is then preferably selected from alkoxylated glycerol tri(meth)acrylates and alkoxylated trimethylolpropane tri(meth)acrylates like ethoxylated trimethylolpropane tri(meth)acrylate.

In a third variant according to the invention, a mixture of at least one compound (E) according to the first variant and at least one compound (E) according to the second variant are used.

The optional compound (E) can be added during or after the formation of the polyurethane (I) of the invention. The optional compound (E) when added, in general is added before the addition of the polyisocyanate (D) or after the conversion of the isocyanate in urethane. Addition at the end of the conversion is preferred.

The amount of the optional compound (E) used is generally between 0 and 40% by weight, relative to the total amount of polyurethane (I) and of compounds (E). Preferably this amount is at least 15% by weight and preferably at most 25% by weight.

The polyurethane (I) of the invention typically is present in an amount between 60 and 100% by weight, relative to the total amount of polyurethane (I) and of compounds (E).

The compositions of the invention can further comprise any additional ingredients typically used in the art.

The radiation-curable compositions according to the present invention may e.g. be subject to additional crosslinking reactions due to the presence of hydroxyl functions and possible other reactive functions present in the polyurethane (I) and/or in external compounds, including oligomers and polymers. Suitable reactive functions include: isocyanate, blocked isocyanate, aziridine, carbodiimide, alkoxysilane, acetoacetoxy, carbonyl and epoxy groups. Suitable external crosslinkers that may therefore be added are (blocked) polyisocyanates, polyaziridines, polycarbodiimides, metal salts like zirconium ammonium carbonate, polyepoxides and polyalkoxysilanes.

Crosslinkers may be used in the invention at a level from 0.01% to 10% by weight, relative to the total weight of the radiation curable aqueous composition of the invention. Preferably the amount of the optional crosslinkers is at least 1% by weight and preferably at most 5% by weight.

The compositions of the invention may also comprise inert or functional resins, pigments, colorants, fillers and/or other additives suitable to improve the application of the formulated dispersion on a substrate and including, not limitatively, dispersing agents, wetting agents, emulsifying agents, antioxidants, flow modification agents, slip agents, fire retardant agents, UV-protection agents, adhesion promoters, and mixtures thereof. The total amount of pigments, colorants, inert resins, fillers and/or additives in the radiation curable aqueous composition of the invention generally does not exceed 60% by weight, preferably it does not exceed 40% by weight.

The composition and process according to the present invention are advantageous in that they are able to provide dispersions with low volatile organic content (VOC), a high solids content, a low viscosity, a low particle size, an excellent stability and a low film formation temperature.

Compositions of the invention, in particular the radiation curable polyurethane dispersions of the invention, typically have a total solid content of at least 30% by weight, preferably at least 35%, more preferably at least 40%, most preferably at least 45%. The polyurethane polymer (I) of the invention permits the preparation of compositions with a very high solid content up to 60%. In general however the total solid content does not exceed 50%, more preferably does not exceed 45% by weight.

The total solid content typically is measured by a gravimetric method involving the dispersion drying during 2 h at 120° C.

The viscosity measured at 25° C. generally ranges from 50 to 5.000 mPa·s. Preferably the viscosity measured at 25° C. is at most 1.000, and most preferably at most 200 mPa·s. Viscosity typically was measured as the Cone-and-Plate viscosity according to DIN EN ISO 3219 yet using a rotational viscometer at 25° C. with a shear rate of 20 s-1 and expressed in milliPascal·second (mPa·s).

Compositions of the invention, in particular the radiation curable polyurethane dispersions of the invention, typically have a pH value of 6 to 10, preferably of 6.5 to 8.

The average particle size typically is between 50 and 300 nm, preferably between 80 and 150 nm as measured by laser light scattering according to ISO/DIS 13321 using a Malvern Autosizer Particle Analyzer.

Typically compositions of the invention are characterized by a total solid content, viscosity, pH, average particle size and as specified above.

An advantage of the invention is that the polyurethane (I) and the radiation curable compositions comprising same can be synthesized (or prepared) without using any solvent. An embodiment of the invention therefore relates to a polyurethane (I) and to radiation curable compositions comprising at least one such polyurethane prepolymer (I) obtained via a solvent-free process.

Polyurethanes (I) of the invention typcially benefit from one or more advantages compared to isocyanate-terminated polyurethane prepolymers:

Lower sensitivity to humidity,
A better storage stability,
Lower amounts of polyisocyanate are needed during the synthesis and no residual free polyisocyanates are present in the polyurethanes (I) obtained, which is advantageous in terms of cost and especially safety.

In comparison to the hydroxyl-terminated polyurethane prepolymers of the art, the polyurethane (I) according to the present invention permits to provide films with excellent water release properties. The composition and process according to the invention in particular are advantageous in that they permit to provide films with excellent water release properties, even when prepared without any solvent.

The present invention therefore also relates to radiation curable polyurethane dispersions synthesized without using any solvent and that provide films with high water release property. These compositions can be used as primer or topcoat for coating on e.g. wood, plastics or concrete.

The radiation-curable compositions according to the present invention are preferably cured by ultraviolet irradiation, generally in the presence of photoinitiator. When used, the amount of photoinitiator in the composition of the invention preferably is between 0.1% and 10% by weight, more preferably between 1 and 5% by weight, most preferably between 2% and 3% by weight, relative to the total weight of the radiation curable composition of the invention. The composition according to the invention may also comprise from 0 to 5% by weight of one or more photosensitizers well known in the art. Compositions of the invention, however, can also be cured by electron-beam irradiation, allowing the use of compositions free of photoinitiator.

As mentioned above, the radiation-curable compositions according to the present invention may also be subject to additional crosslinking reactions due to the presence of hydroxyl functions and possible other reactive functions present in the polyurethane (I) and/or in external compounds, including oligomers and polymers.

The compositions according to the invention are suitable for making inks and overprint varnishes, as well as coatings. They are especially suitable for making coatings, in particular primer and top coatings for wood, plastic and concrete. Coating can take place inside or outside the factory coating environment.

The present invention therefore also relates to the use of the compositions for making inks, varnishes or coatings and to a process for making inks, varnishes or coatings wherein a composition as described here above is used. The present invention also relates to process for preparing a coated article comprising a step wherein the article is coated with a radiation curable composition according to the invention. In this process additional external crosslinkers, such as (blocked) polyisocyanates, polyaziridines, polycarbodiimides, metal salts like zirconium ammonium carbonate, polyepoxydes and polyalkoxysilanes, may be added to the radiation curable composition according to the invention as described here above.

The present invention also relates to an article coated, entirely or in part, with a coating composition according to the invention.

In a particular embodiment of invention the article is coated on site, id est outside the factory coating environment. The coated article is then exposed to radiation from a mobile electromagnetic radiation device. The compositions of the invention are thus suitable for use in what is commonly known as field applied applications.

Advantages of a high reactivity of the compositions of the invention is that one can operate at higher line speeds and/or that less irradiative energy is needed in the curing step.

The examples which will follow illustrate the invention without limiting it.

Examples 1 to 2 and Comparative Example 3R

Aqueous polyurethane dispersions have been prepared following the process described here below. Quantities and nature of the components are given in table 1.

A double-wall glass reactor equipped with a mechanical stirrer, a thermocouple, a vapor condenser and a dropping funnel was charged under air-sparge with compounds A and B, 150.0 g of TMP(EO)TA and 0.45 g Bismuth octoate. The reaction mixture was completely homogenized and heated to 60° C. Compounds D, were slowly added to the vessel in approximately 15 minutes. The T° is increased to 75-80° C. and maturation was done until an isocyanate content <0.02 meq/g was obtained.

18.6 g of an aqueous solution of 25 wt % sodium hydroxide was added to the reactor. 20 minutes after starting the addition of the NaOH solution, 544 g of demineralized water was slowly added to the reactor under high shear agitation. Solid content was adjusted to the desired % solids by adding more water. The dispersion was cooled down to room temperature and filtered over a 5μm filter bag.

Example 4

The aqueous polyurethane dispersion of Example 4 has been prepared according to the process of Examples 1 and 2. Quantities and nature of the components are given in table 1.

TABLE 1 amounts are in grams

| | Component | Ex 1 | Ex 2 | Ex 4 | Ex 3R |
|---|---|---|---|---|---|
| A | Bis A diA | 187.4 | 126.6 | 107.3 | 206.5 |
| C | Glyc (OP) diA | — | — | 55.4 | — |
| B | PA NPG | — | 59.9 | 24.9 | — |
|   | DMPA | 16.5 | 19.5 | 14.5 | 16.5 |
| D | HDI | — | — | — | 57.8 |
|   | TMXDI | 96.1 | 94.0 | 97.8 | 19.3 |
| E | TMP(EO)TA | 150 | 150 | 150 | 150 |

Bis A diA Bisphenol A epoxide diacrylate adduct (IOH ~220)
Glyc (OP) diA Propoxylated glycerol diacrylate (IOH ~179)
PA NPG Polyadipate based on Adipic acid & neopentylglycol (IOH ~168/Iac <1)
DMPA 2,2-Dimethylolpropionic acid
HDI 1,6 Hexanediisocyanate
TMP (EO)TA ethoxylated trimethylolpropane triacrylate (Hydroxyl index <20)
TMXDI Tetramethylxylenediisocyanate

TABLE 2

Main characteristics of the dispersions

| Component | Ex 1 | Ex 2 | Ex 4 | Ex 3R |
|---|---|---|---|---|
| Viscosity at 25° C. (mPa · s) | 250 | 39 | 149 | 780 |
| Solids content | 39.8 | 44.1 | 39.0 | 39.2 |
| Particle size | 130 | 93 | 83 | 182 |
| Stability at 60° C. | >10 d | >10 d | >10 d | >5 d |
| Water release | 3-4 | 3-4 | 3 | 0 |

The viscosity of the dispersion was measured by Cone & Plates as described above.

The dry content (solids content) was measured by a gravimetric method as described above.

The average particle size of the aqueous polymer dispersion was measured by laser light scattering using a Malvern Autosizer Particle Analyzer as described above.

The colloidal stability was assessed by observing the decantation and/or phase separation on a 200 g sample placed in an oven at 60° C.

The water release was assessed by observing the visual aspect after 48 hours of non pigmented coating made in the following conditions: 200μ wet layers were applied with a racle on grey PVC 3 mm sheets. Water was evaporated from the coatings according to the following cycle: 4 minutes at 30° C., followed by 2 minutes at room temperature and then 3 minutes at 50° C. Subsequently coatings were exposed to UV radiations from a 80 Watt Hg lamp at a defined conveyer speed: 1×5 m/minute. Formulations used in this set up were prepared by mixing 100 g of the respective polyurethane dispersions with 1.5 g of Additol BCPK (a photo initiator from Cytec) and 0.8 g of UCECOAT 8460 (a thickener from Cytec). Rating was on a scale from 5 to 0, wherein 5 stands for transparent coatings (very good water release properties) and 0 stands for white opaque coatings (very bad water release properties). According to the rating used 1 stands for very hazy/grey with white zones, 2 stands for very hazy/grey, 3 stands for hazy/grey and 4 stands for light hazy/light grey Various properties of the films prepared with the respective dispersions were then measured. Results are summarized in Table 3. The following formulations were prepared for coating of wood panels (Beech and Sapelli): 75 g of the polyurethane dispersions of respectively Examples 2 and 3 were mixed with 25 parts of Viacryl 6295 (Acrylic emulsion from Cytec), 1.5 g of TS 100 (silica from Degussa), 3 g of Aquamat 208 (water-based wax from Degussa) and 1.5 g of Additol BCPK100 (photoinitiator from Cytec). 2×60 gr/m² wet coatings were applied on Sapelli panels and 3×60 g/m² wet coatings were applied on Beach panels by spray application. Water was evaporated from the coatings according to the following cycle: 3 times 1.5 minutes at 40° C., followed by 1.5 minutes at 50° C. with additional Jet-drying. Subsequently coatings were exposed to UV radiations from a 80 Watt Hg lamp at a defined conveyer speed: 1×10 m/minute for the first and/or second layer, and 2×10 m/min for the top layer. Coating surfaces were sanded before application of the next layer. Adhesion test: a film of 60 μm thickness is applied on sanded wood panels and fully cured as described above. A square pattern is engraved in the coating with a cutter. A string of adhesive tape (Tesa 4104) is pressed on the surface. The tape is then pulled off. Based on the number of squares removed by the tape, a value of adhesion is given ranging from 0=perfect result, to 5=worst result. Herein, a rating is given for interlayer adhesion.

Coin test: A sharp edged coin is taken between forefinger and thumb by the operator, it is pressed firmly on the lacquer surface and pulled, exerting constant force, across the film. In the case of a poor adhesion between the film and surface, scratches will appear and there will be a typical stress whitening of the coating. This procedure is the simplest method for checking the adhesion. It however requires skilled personnel to determine the quality of the treated surface. The results are expressed by ranking the samples relative to each other, preferably by giving the number 1 to the best performing coating.

Erichsen hardness test: The Erichsen hardness is a common method for the measurement of the hardness of protective coatings. The estimated or known spring tension on the instrument (Model 318) is set with the help of a slider. Holding the instrument upright and placing the point of the stylus (Bosch, 0.75 mm) on the test substrate, one subsequently draws a 5 to 10 mm long line at a speed of approximately 10 mm/sec. The stylus should produce a scratch which is barely visible with the naked eye. If the spring force is too high, the scratch is too clearly visible; if it is too low, no scratch appears. The coating hardness corresponds to the applied force (measured in Newtons) which leads to the apparition of a first visible scratch of the coating. A higher hardness is expected to provide a better protection against any exposure to scratching conditions during storage and use. Pencil hardness: Pencil hardness testing is a simple method for determining scratch resistance and hardness of a coating, and is performed as follows: An operator points with a pencil at a 45° angle onto a coated panel, which is kept in place on a horizontal surface. The test is repeated with pencils of increasing hardness until one or both of the following defects are marked on the coating: a permanent deformation of the paint without cohesive fracture, or a cohesive fracture of the paint. In other words: a visible scratch or a rupture in the surface of the paint. The reported value is the hardness of the hardest pencil which gave no defect on the coating. This method is based on the ISO 15184 method and is preferably performed using the Elcometer 501 Pencil Hardness Tester.

Hamberger(-Höbel) test: a full coating system is applied on sanded wood panels, cured and placed on the Hamberger-Höbel tester, an apparatus obtainable from Hamberger. The apparatus is equipped with a screw which may be turned in such a way that the pressure exerted by a coin on the coating can be varied. The pressure is increased step by step until a scratch of a few centimeters is formed on the coated surface. The higher the applied pressure before the scratch is formed, the better the scratch resistance. The scratch resistance is expressed in Newton.

Stain resistance test: The method covers the chemical resistance of a coating of 60 μm thick which was wet applied to a non-porous substrate, typically half white, half black Leneta paper is being used. The coating was dried for 5 minutes at 60° C. and then cured under a UV-lamp (Hg) of 80 W/cm at a conveyor speed of 5 m/min. The stain resistance is assessed by putting a test substance onto the coating, cover it with a microscope glass and leave it for 4 to 16 hours. The test substances used are ammonia (1 and 3% wt solutions in water), ethanol (50% wt in water), acetone, eosine, mustard, coffee and red wine. The stains are then cleaned by washing with a couple of rubs using a tissue that was saturated with isopropanol. The remaining stains are assessed visually using a 1 to 5 scale, assigning 0 to the best performing coating. A high value (0) is expected to provide the best protection against any household product spillage.

Stain resistance test: The method covers the chemical resistance of a coating of 60 μm thick which was wet applied to Beech panels. The coating was dried for 5 minutes at 60° C. and then cured under a UV-lamp (Hg) of 80 W/cm at a speed of 5 m/min. The stain resistance is assessed by putting a test substance onto the coating, cover it with a microscope glass and leave it for 1, 4, 7 and 24 hours respectively. The test substances used are ammonia (1 and 10% wt solutions in water), ethanol (50% wt in water), acetone, eosine, mustard, coffee, isopropanol (IPA) and red wine. The stains are then cleaned by washing with a couple of rubs using a tissue that was saturated with isopropanol. The remaining stains are assessed visually using a 1 to 5 scale, assigning 0 to the best performing coating. A low value (0) is expected to provide the best protection against any household product spillage.

Solvent resistance: The solvent resistance is assessed with acetone double rubs (ADR), by pressing a cotton rag saturated with acetone with a backward and forward motion over the coated surface. One double rub is the sum of a backward and forward stroke on the coated surface. The reported number is the number of double rubs required to break through the coating. A high solvent resistance, typically more than one hundred acetone double rubs, is necessary to ensure a good protection of the coating and the substrate against any household or industrial product spillage. Similar tests are done respectively with cotton drenched in water and isopropanol (IPA).

The results in Table 3 show that coatings produced with the compositions of the invention exhibit excellent water release properties, even when prepared according to a solvent free process. Films produced from a polyurethane that does not have compounds (B2) and/or (B3) incorporated in its backbone exhibited very poor water release properties (Example 3R), irrespective of whether TMXDI was combined with other polyisocyanates or not.

Dispersions according to the invention further permit to obtain coatings with excellent esthetic and performance levels (Table 3).

TABLE 3

| Coating based on | | Ex 2 |
|---|---|---|
| Adhesion: (interlayer) | Sapelli | 0 |
| | Beech | 0 |
| Coin test (Ranking) | Beech | 3 |

TABLE 3-continued

| Coating based on | | Ex 2 |
|---|---|---|
| Erichsen (N): | Beech | 12 |
| Pencil hardness | Beech | B |
| Hamberger (N): | Beech | 29 |
| Chemical resistance: | Beech | 1 h - 4 h - 7 h - 24 h |
| 0 = no visual stain | NH$_3$ 1% | 1 - 1 - 1 - 3/4 |
| 1 = very light stain | NH$_3$ 10% | 1 - 1 - 3 - 3/4 |
| 2 = moderate stain | Red wine | 1 - 1 - 1 - 1 |
| 3 = strong stain | Mustard | 1 - 3 - 3 - 3 |
| 4 = very strong stain | EtOH 50% | 1 - 1 - 1 - 1 |
| 5 = out of spec | Acetone | 1 - 1 - 1 - 1 |
| | IPA | 1 - 1 - 1 - 1 |
| | Coffee | 0 - 0 - 0 - 0 |
| | Eosine | 0 - 1 - 2 - 3 |
| Double Rubs | Water | >100 |
| | Acetone | >100 |
| | IPA | >100 |

The invention claimed is:

1. An ethylenically unsaturated hydroxyl-terminated polyurethane (I) obtained by reacting
   (i) at least one ethylenically unsaturated compound (A) containing at least two reactive groups capable of reacting with isocyanate groups and at least one ethylenically unsaturated group,
   wherein the at least one ethylenically unsaturated compound (A) is selected from the group consisting of polyester (meth)acrylates comprising hydroxyl groups, polyepoxy (meth)acrylates comprising hydroxyl groups, and mixtures thereof, or
   wherein at least one ethylenically unsaturated compound (A) is selected from compounds that are obtained from partial esterification of aliphatic and/or aromatic polyhydric polyols with (meth)acrylic acid and have a residual average hydroxyl functionality of at least 2.0 in the molecule; with
   (ii) at least one saturated alcohol component (B) comprising:
      (iia) at least one saturated hydroxylated compound (B1) containing hydrophilic groups capable of rendering the polyurethane dispersible in aqueous medium either directly or after the reaction with a neutralizing agent to provide a salt, and, optionally, at least one compound (B2) that is selected from saturated polyester polyols (B21) and/or from saturated polycarbonate polyols (B22); and/or
      (iib) at least one compound (B3) that is selected from saturated polyester polyols (B31) containing compound (B1) moieties and/or from saturated polycarbonate polyols (B32) containing compound (B1) moieties; and, optionally, one or more of compounds (B1) and/or (B2);
   (iii) optionally, at least one ethylenically unsaturated compound (C) containing essentially one reactive group capable of reacting with isocyanate groups; and
   (iv) at least one polyisocyanate (D) selected from m-tetramethylxylenediisocyanate, p-tetramethylxylenediisocyanate, mixtures thereof, or derivatives thereof,
   wherein compound (A) is used in an amount of from 25 to 65% by weight, relative to the total weight of polyurethane (I), and
   wherein the groups capable of reacting with isocyanate groups are hydroxyl groups, and wherein the polyurethane (I) has a hydroxyl value of between 5 and 60 mg KOH/g.

2. The polyurethane according to claim 1, wherein the polyurethane (I) optionally, further is prepared from (v) at least one further polyisocyanate different from said tetramethylxylenediisocyanate, if component (B) comprises one or more of compounds (B2) and/or (B3).

3. The polyurethane according to claim 1, wherein compounds (A) through (D) are used in such an amount that the ratio between the isocyanate groups and between the reactive groups capable of reacting with said isocyanate groups is between 0.5 and 0.95.

4. The polyurethane according to claim 1, wherein the isocyanate content is between 0 and 0.05% based on the weight of the polyurethane (I).

5. The polyurethane according to claim 1, wherein, relative to the total weight of the polyurethane (I), from 25 to 65% by weight of compounds (A) are reacted with from 5 to 40% by weight of components (B), from 0 to 20% by weight of compounds (C), and from 20 to 50% by weight of polyisocyanates (D).

6. The polyurethane according to claim 1, wherein compounds (A) are obtained from the reaction of diglycidyl compounds with (meth) acrylic acid.

7. The polyurethane according to claim 1, wherein component (B) consists of at least one compound (B1), and, optionally one or more compounds (B2).

8. The polyurethane according to claim 1, wherein component (B) consists of least one compound (B3) and, optionally, one or more compounds (B1) and/or (B2).

9. The polyurethane according to claim 1, wherein compound (C) is selected from (meth)acryloyl mono-hydroxy compounds.

10. The polyurethane according to claim 1, wherein the polyisocyanate (D) consists of tetramethylxylenediisocyanate (TMXDI).

11. A radiation curable composition comprising at least one polyurethane (I) according to claim 1.

12. The composition according to claim 11 comprising, relative to the total amount of polyurethane (I) and of compounds (E), from 60 to 100% by weight of the polyurethane (I), and, optionally from 0 to 40% by weight of at least one (meth) acryloyl-compound (E) with a hydroxyl value of less than 25.

13. The composition according to claim 11 which is an aqueous composition having a total solids content of at least 35% by weight.

14. The composition according to claim 11, which is produced according to a solvent free process.

15. A coating composition, ink or varnish comprising at least one polyurethane (I) according to claim 1 or a radiation curable coating composition comprising at least one polyurethane (I) according to claim 1.

16. An article coated, entirely or in part, with a coating composition according to claim 15.

17. The polyurethane according to claim 1, wherein the derivatives of m-tetramethylxylenediisocyanate and/or p-tetramethylxylenediisocyana are adducts or prepolymers prepared from m-tetramethylxylenediisocyanate, p-tetramethylxylenediisocyanate, and polyols.

* * * * *